(12) United States Patent
Mushika

(10) Patent No.: US 7,068,415 B2
(45) Date of Patent: Jun. 27, 2006

(54) DEFORMABLE MIRROR AND OPTICAL CONTROLLER INCLUDING THE DEFORMABLE MIRROR

(75) Inventor: Yoshihiro Mushika, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/491,100

(22) PCT Filed: Nov. 26, 2002

(86) PCT No.: PCT/JP02/12344

§ 371 (c)(1),
(2), (4) Date: Jul. 23, 2004

(87) PCT Pub. No.: WO03/065103

PCT Pub. Date: Aug. 7, 2003

(65) Prior Publication Data

US 2005/0152019 A1   Jul. 14, 2005

(30) Foreign Application Priority Data

Jan. 29, 2002   (JP)   .................. PCT/JP02/00676

(51) Int. Cl.
*G02B 26/00*   (2006.01)
(52) U.S. Cl. ..................... 359/291; 359/224
(58) Field of Classification Search ............... 359/291, 359/290, 292, 293, 295, 223, 224, 320, 322
See application file for complete search history.

(56) References Cited

U.S. PATENT DOCUMENTS 4,737,621 A   4/1988   Gonsiorowski et al.

(Continued)

FOREIGN PATENT DOCUMENTS

EP   0 790 604 A2   8/1997

(Continued)

OTHER PUBLICATIONS

Vdovin, et al., "Technology and applications of micromachined adaptive mirrors", *J. Micromach. Microeng.*, vol. 9, pp. R8-R19 (1999).

(Continued)

*Primary Examiner*—Hung Juan Dang
*Assistant Examiner*—Tuyen Tra
(74) *Attorney, Agent, or Firm*—Akin Gump Strauss Hauer & Feld, LLP

(57) ABSTRACT

A deformable mirror according to the present invention includes a substrate 1, a plurality of micromirrors 20, which are supported by the substrate 1 while being segmented from each other, and a plurality of driving sections, which drive the micromirrors 20 independently of each other. Each of the driving sections includes a number of fixed electrodes 5 to 7, and the same number of movable electrodes 13 to 15, which are provided so as to face the fixed electrodes 5 to 7. Each of the micromirrors 20 is coupled to at least two of the movable electrodes 13 to 15, which are associated with the micromirror 20. The deformable mirror can displace each micromirror 20 perpendicularly to the substrate 1 and/or tilt the micromirror 20 with respect to the substrate.

22 Claims, 6 Drawing Sheets

U.S. PATENT DOCUMENTS

| | | | |
|---|---|---|---|
| 5,079,544 A | 1/1992 | DeMond et al. | |
| 5,886,811 A | 3/1999 | Min | |
| 6,044,705 A * | 4/2000 | Neukermans et al. | 73/504.02 |
| 6,057,913 A | 5/2000 | Brown et al. | |
| 6,185,167 B1 | 2/2001 | Arai et al. | |
| 6,220,707 B1 | 4/2001 | Bille | |
| 6,262,827 B1 * | 7/2001 | Ueda et al. | 359/224 |
| 6,411,576 B1 | 6/2002 | Furukawa et al. | |
| 6,430,137 B1 | 8/2002 | Saimi et al. | |
| 6,533,947 B1 * | 3/2003 | Nasiri et al. | 216/2 |

FOREIGN PATENT DOCUMENTS

| | | |
|---|---|---|
| JP | 01-253841 A | 10/1989 |
| JP | 07-084196 A | 3/1995 |
| JP | 09-237425 A | 9/1997 |
| JP | 10-289468 A | 10/1998 |
| JP | 11-014918 A | 1/1999 |
| JP | 11-231234 A | 8/1999 |
| JP | 11-305159 A | 11/1999 |
| JP | 2000-182268 A | 6/2000 |
| JP | 2000-235715 A | 8/2000 |
| JP | 2001-174724 A | 6/2001 |
| JP | 02/061488 A1 | 8/2002 |

OTHER PUBLICATIONS

Cowan, et al., "Surface Micromachined Segmented Mirrors for Adaptive Optics", *IEEE J. of Selected Topics in Quantum Electronics,* vol. 5, No. 1, pp. 90-101 (1999).

Aldrich, "Deformable Mirror Wavefront Connectors", *Adaptive Optics Engineering Handbook,* pp. 151-197 (2000).

Aruga, "Application of Adaptive Optics to Communication and Sensing", *The Journal of the Institute of Electornics, Information and Communication Engineers,* vol. 80, No. 12, pp. 1237-1241 (1997).

Krishnamoorthy Mali, et al., "Development of microelectromechanical deformable mirrors for phase modulation of light", *Optical Engineering,* vol. 36, No. 2, pp. 542-548 (1997).

Hornbeck, et al., "Digital Light Processing for High-Brightness, High-Resolution Applications", Texas Instruments, Inc., pp. 1-14.

* cited by examiner

_US 7,068,415 B2_

DEFORMABLE MIRROR AND OPTICAL CONTROLLER INCLUDING THE DEFORMABLE MIRROR

CROSS-REFERENCE TO RELATED APPLICATION

This application is a Section 371 of International Application No. PCT/JP02-12344, filed Nov. 26, 2002, the disclosure of which is incorporated herein by reference.

TECHNICAL FIELD

The present invention relates to a deformable mirror having a light reflecting region that can displace with an electrostatic force and also relates to an optical controller for controlling the wavefront of light with such a deformable mirror.

BACKGROUND ART

Deformable mirrors are going to find applications in optical compensators for correcting the wave aberration of light actively, displays, and optical switches for use in optical communication. Recently, there are a number of R & D reports that a bunch of micromirrors be formed by a micro-machining technique to cut down the cost. Those micromirrors are often driven with an electrostatic force. A type of deformable mirror, driving the micromirrors with an electrostatic force, has a planar and simple structure, and therefore, is highly compatible with a semiconductor device manufacturing process. In addition, as the size of each member such as a mirror is reduced, the electrostatic force produces greater driving force per unit area.

However, in utilizing an electrostatic force, basically only the attraction works unlike the case of using a piezoelectric element. Thus, the driving direction is asymmetric. Also, the driving force is not generated due to the expansion or shrinkage of the structure of the driving portion itself. Accordingly, a pair of electrodes, which is arranged so as to face each other with a gap provided between them, and a structure for supporting this pair of electrodes are needed.

Deformable mirrors are roughly classifiable into "continuous mirrors", of which one continuous mirror surface is deformed with a lot of actuators, and "segmented mirrors", in which a number of mutually separated mirrors are moved independently of each other.

In an exemplary continuous mirror, a potential difference is created between a thin-film mirror and a lot of electrodes, which are arranged so as to be spaced apart from each other, thereby producing an electrostatic force, attracting the deformable mirror toward the electrodes and deforming it (see, for example, G. Vdovin, P. M. Sarro and S. Middelhoek, "Technology and Applications of Micromachined Adaptive Mirrors", J. Micromech. Microeng. 9 (1999), R8 to R20).

Examples of segmented mirrors include a mirror in which micromirrors are attracted with an electrostatic force parallel to the substrate (see, for example, W. D. Cowan, M. K. Lee, B. M. Welsh et al., "Surface Micromachined Segmented Mirrors for Adaptive Optics", IEEE Journal of Selected Topics in Quantum Electronics Vol. 5, No. 1, pp. 90–101 (1999)) and another mirror that causes a tilting operation, not the parallel shifting operation (e.g., Japanese Laid-Open Publication No. 2001-174724). A segmented mirror that uses a stacked piezoelectric element performs the parallel shifting operation and tilting operation at the same time (see, for example, R. K. Tyson, "Adaptive Optics Engineering Handbook", Marcel Dekker Inc. (2000) (Chapter 5, p. 155, FIG. 2)).

However, these deformable mirrors have the following drawbacks.

The continuous mirror can generate a continuous and smooth wavefront, and therefore, can reduce the wavefront fit error even with a small number of actuators. Nevertheless, it is difficult for the continuous mirror to secure a control range and reduce the drive voltage at the same time. That is to say, to secure a sufficient control range, the gap distance between the mirror and the electrodes needs to be increased. However, the magnitude of the electrostatic force is inversely proportional to the square of the gap distance. Thus, no electrostatic force can be obtained unless a high voltage is applied. In addition, the continuous mirror has a lower response speed than the segmented mirror, and the residual stress of the mirror film seriously affects the planarity of the mirror.

On the other hand, the segmented mirror is more advantageous than the continuous mirror in terms of the response speed and planarity. Also, the respective mirrors are independent of each other. Accordingly, even if the control range exceeds a wavelength $\lambda$, an arbitrary control range is still achieved by performing a shifting process of converting the excessive wavelength back to its associated principal value falling within the range of 0 to $\lambda$. As a result, the reduced voltage and broad control range are achieved at the same time.

However, the conventional segmented mirror attracts and shifts the respective mirrors parallel and can produce only a stepped wavefront. Accordingly, to reduce the wavefront fit error, the number of mirrors segmented should be much greater than that of the continuous mirror, thus increasing the number of actuators, too. As a result, the control structure gets too much complicated or the area of the gap between the mirrors increases with respect to the area of each mirror. Consequently, the reflection efficiency decreases and the effects of unwanted diffracted light increase.

The segmented mirror that uses a piezoelectric element can produce a smooth wavefront by performing the parallel shifting and tilting operations simultaneously, thus minimizing the wavefront fit error with just a small number of mirrors segmented. But this segmented mirror has no compatibility with a semiconductor device manufacturing process and is hard to mass-produce at a low cost.

It should be noted that it is difficult to realize the configuration including the piezoelectric element with an electrostatic deformable mirror for the following two reasons:

Firstly, it is difficult for the electrostatic deformable mirror, producing only the attraction, to control the parallel shifting operation and the tilting operation independently.

Secondly, unlike the piezoelectric element that generates a driving force by its own structural expansion or shrinkage, the electrostatic deformable mirror needs a pair of electrodes, which is arranged with a gap provided between them, and a structure for supporting the electrodes as separate members. Thus, it is difficult to provide the pair of electrodes, of which the area is broad enough to obtain a big electrostatic force, and the supporting structure, which enables both the parallel shifting operation and tilting operation alike, within the limited areas of segmented mirrors of such a deformable mirror.

In order to overcome the problems described above, an object of the present invention is to provide a deformable mirror, which can minimize the wavefront fit error with just a small number of mirrors segmented, and an optical controller including such a deformable mirror.

DISCLOSURE OF INVENTION

A deformable mirror according to the present invention includes: a substrate; a plurality of micromirrors, which are supported by the substrate while being segmented from each other; and a plurality of driving sections, which drive the micromirrors independently of each other, thereby controlling arrangements of the respective micromirrors with respect to the substrate. Each of the driving sections includes: a number of fixed electrodes, to which drive voltages are applicable independently of each other; and the same number of movable electrodes, which are provided so as to face the fixed electrodes. Each of the micromirrors is coupled to at least two of the movable electrodes, which are associated with the micromirror. The deformable mirror can displace each micromirror perpendicularly to the substrate and/or tilt the micromirror with respect to the substrate by utilizing an electrostatic force to be produced due to a potential difference between the at least two movable electrodes and at least two of the fixed electrodes that are associated with the movable electrodes.

In one preferred embodiment, each of the driving sections includes: a first fixed electrode, which contributes to displacing a first particular portion of the micromirror; and a second fixed electrode, which contributes to displacing a second particular portion of the same micromirror, which is different from the first particular portion. By applying drive voltages to the first and second fixed electrodes, the deformable mirror displaces the first and second particular portions independently of each other, thereby controlling the arrangement of the micromirror with respect to the substrate.

In another preferred embodiment, each of the first and second fixed electrodes is divided into multiple fixed-electrode pieces to which drive voltages are independently applicable. By selectively applying the drive voltages to the multiple fixed-electrode pieces, the deformable mirror can control the displacements of the respective particular portions of the associated micromirror bidirectionally both toward the substrate and away from the substrate alike.

In another preferred embodiment, the movable electrodes include: a rotational member, which is supported by the substrate so as to rotate on an axis of rotation; and a functional member, which changes distances between the particular portions of the micromirror and the substrate as the rotational member moves. The rotational member includes: a supporting portion, which is provided on the axis of rotation; and a flat plate portion, which is connected to the supporting portion. The flat plate portion of the rotational member includes a first conductive portion and a second conductive portion, which are arranged symmetrically with respect to the axis of rotation. The multiple fixed-electrode pieces include: a first fixed-electrode piece, which faces the first conductive portion of the flat plate portion with a gap provide between them; and a second fixed-electrode piece, which faces the second conductive portion of the flat plate portion with a gap provide between them.

In another preferred embodiment, the functional member includes: a flat-plate intermediate coupling member; and a plurality of protrusion members, which connect either the first conductive portion or the second conductive portion of the movable electrodes to the intermediate coupling member. The intermediate coupling member and the micromirror are coupled together approximately at the center of the intermediate coupling member.

In another preferred embodiment, either the first conductive portion or the second conductive portion and the intermediate coupling member are rotatable freely by way of the protrusion members.

In another preferred embodiment, each of the driving sections further includes a third fixed electrode, which contributes to displacing a third particular portion of the same micromirror. The third particular portion is different from the first and second particular portions thereof. By applying drive voltages to the first, second and third fixed electrodes, the deformable mirror displaces the first and third particular portions independently of each other, thereby controlling at least the operations of displacing the micromirror perpendicularly to the substrate and tilting the micromirror along two axes with respect to the substrate.

In another preferred embodiment, each of the micromirrors reflects light with a wavelength $\lambda$. The driving sections control the arrangements of the micromirrors such that a difference between the optical path length of light reflected by one of the micromirrors and that of light reflected by another one of the micromirrors, which is adjacent to the former micromirror, becomes substantially equal to $n \cdot \lambda$ (where n is an integer).

In another preferred embodiment, each fixed-electrode piece includes a plurality of partial electrodes, to which drive voltages are applicable independently of each other. The partial electrodes include at least a first partial electrode and a second partial electrode, which have mutually different areas. The area of the second partial electrode is defined smaller than that of the first partial electrode. The second partial electrode is arranged closer to the axis of rotation than the first partial electrode is.

In another preferred embodiment, the product of a distance from the center of the first partial electrode to the axis of rotation and the area of the first partial electrode is substantially a power of two times as large as the product of a distance from the center of the second partial electrode to the axis of rotation and the area of the second partial electrode.

In another preferred embodiment, the deformable mirror further includes a driver circuit for generating the drive voltages on the substrate.

In another preferred embodiment, at least the fixed electrodes and the movable electrodes are made of a patterned conductive film.

An optical controller according to the present invention includes a deformable mirror, in which a plurality of micromirrors are supported on a substrate, so as to make the deformable mirror transform the wavefront of a light beam, which has been emitted from a light source, into a desired target wavefront. The optical controller further includes: beam control target setting means for setting the target wavefront; mirror control target setting means for setting target values representing arrangements of the respective micromirrors with respect to the substrate based on the output of the beam control target setting means; and mirror control means for controlling the respective micromirrors in accordance with the output of the mirror control target setting means. The deformable mirror is one of the deformable mirrors described above.

BEST MODE FOR CARRYING OUT THE INVENTION

Hereinafter, preferred embodiments of the present invention will be described with reference to the accompanying drawings.

EMBODIMENT 1

First, a deformable mirror according to a first preferred embodiment of the present invention will be described with reference to FIGS. 1 and 2.

The deformable mirror of this preferred embodiment has a configuration in which a plurality of actuators (i.e., driving sections) and a driver circuit for driving those actuators are integrated together on the same silicon substrate. This deformable mirror is preferably fabricated by semiconductor processing technologies.

Figure 1:
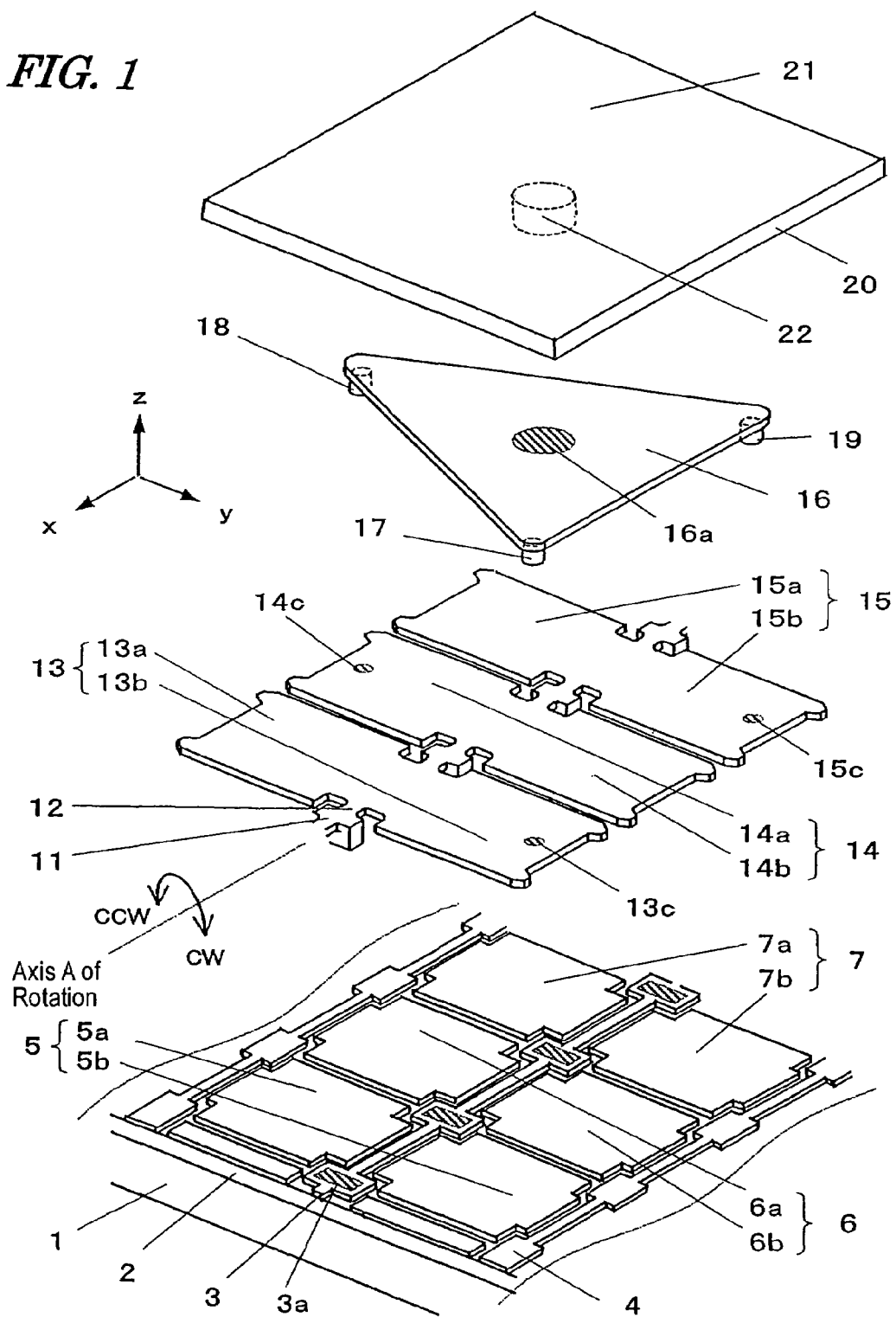
FIG. 1 is an exploded perspective view of a deformable mirror according to a first embodiment of the present invention.

Referring to FIG. 1, illustrated is an exploded perspective view of a deformable mirror according to this preferred embodiment. The deformable mirror of this preferred embodiment actually has a configuration in which a plurality of micromirrors (or reflective mirror elements) 20 are arranged in a two-dimensional array. In FIG. 1, just one of those micromirrors 20 and its associated driving section are illustrated on a large scale.

In the deformable mirror of this preferred embodiment, the driving sections control the positions of the respective micromirrors 20 arranged on the substrate 1 and their distances from the substrate 1. These driving sections are controlled by the driver circuit (not shown) that is provided on the same substrate 1.

In this preferred embodiment, a silicon nitride insulating layer 2 is provided on the substrate 1 and a base 3, a yoke contact portion 4, a first fixed electrode 5, a second fixed electrode 6 and a third fixed electrode 7 are arranged on the insulating layer 2. The base 3, yoke contact portion 4 and fixed electrodes 5 to 7 are formed by patterning a conductive film of aluminum (Al), polysilicon or any other suitable material.

To drive the single micromirror 20 shown in FIG. 1, the first, second and third fixed electrodes 5, 6 and 7 are used in this preferred embodiment. Thus, not just the operation of tilting the micromirror 20 with respect to the substrate 1 but also its displacement and/or tilting perpendicular to the substrate 1 are controllable independently.

Hereinafter, the configuration of this preferred embodiment will be described in further detail.

As shown in FIG. 1, in the deformable mirror of this preferred embodiment, the first fixed electrode 5 is divided into two fixed-electrode pieces 5a and 5b, to which drive voltages are applied independently of each other. In the same way, the second fixed electrode 6 is also divided into two fixed-electrode pieces 6a and 6b, to which drive voltages are applied independently of each other, and the third fixed electrode 7 is divided into two fixed-electrode pieces 7a and 7b, to which drive voltages are applied independently of each other, too. On the other hand, the potentials of the base 3 and yoke contact portion 4 are set equal to the ground potential.

These fixed-electrode pieces 5a, 5b, 6a, 6b, 7a and 7b are electrically connected to the driver circuit on the substrate 1 by way of via metals (not shown), which are provided in the insulating layer 2. The driver circuit can apply mutually independent voltages, all of which fall within the range of 0 V to 5 V, to the fixed-electrode pieces 5a, 5b, 6a, 6b, 7a and 7b. By regulating the voltages to be applied to these six fixed-electrode pieces 5a, 5b, 6a, 6b, 7a and 7b, the position of the single micromirror 20 can be controlled.

A supporting post 11 is connected to the base 3 at multiple sites 3a of the base 3. A first yoke 13, a second yoke 14 and a third yoke 15 are secured to the supporting post 11 via a hinge 12. These yokes 13, 14 and 15 face their associated fixed electrodes 5, 6 and 7, respectively, so as to function as movable electrodes.

In this preferred embodiment, the supporting post 11, hinge 12 and first, second and third yokes 13, 14 and 15 are formed by patterning an electrically conductive material such as aluminum (Al) or polysilicon, and are electrically continuous with the base 3 so as to have the ground potential.

The first yoke 13 has a first portion 13a and a second portion 13b, which respectively face the fixed-electrode pieces 5a and 5b of the first fixed electrode 5. If a drive voltage is applied to the fixed-electrode piece 5a, then the first portion 13a will be attracted toward the fixed-electrode piece 5a. On the other hand, if a drive voltage is applied to the fixed-electrode piece 5b, then the second portion 13b will be attracted toward the fixed-electrode piece 5b. In this manner, the rotational force can be produced around the axis A of rotation either clockwise CW or counterclockwise CCW.

Likewise, the second yoke 14 has a first portion 14a and a second portion 14b and the third yoke 15 has a first portion 15a and a second portion 15b. By selectively applying a drive voltage to any of those fixed-electrode pieces 6a, 6b, 7a and 7b, the rotational force can be produced around the axis A of rotation either clockwise CW or counterclockwise CCW.

An intermediate coupling member 16 has a substantially triangular planar shape and includes three protrusion members 17, 18 and 19 in the vicinity of the vertices of the triangle. These protrusion members 17, 18 and 19 stick out perpendicularly from the lower surface of the flat-plate portion of the intermediate coupling member 16.

Among these three protrusion members 17, 18 and 19, the protrusion member 17 is coupled with the first yoke 13 at a point 13c. In the same way, the protrusion member 18 is coupled with the second yoke 14 at a point 14c and the protrusion member 19 is coupled with the third yoke 15 at a point 15c. By driving and rotating the first, second and third yokes 13, 14 and 15 independently of each other, the displacements of the protrusion members 17, 18 and 19 are controllable independently and the position of the intermediate coupling member 16 is adjustable, too. In this preferred embodiment, the three protrusion members 17, 18 and 19 are not arranged in line, and therefore, the positioning control can be carried out along three axes.

The micromirror 20 has a reflective plane 21 as its upper surface and is coupled through a protrusion 22 to the intermediate coupling member 16 approximately at the center 16a thereof. Thus, the position of the intermediate coupling member 16 determines the position of the micromirror 20. In this preferred embodiment, the reflective plane 21 is a multilayer dielectric mirror film, obtained by alternately stacking silicon nitride layers and silicon dioxide layers a number of times, so as to achieve high reflection efficiency. The dielectric reflective mirror film preferably has a thickness of at least 5 μm, thus increasing the rigidity of the micromirror 20 itself and minimizing the decrease in the planarity of the reflective plane 21 due to a residual stress.

In this preferred embodiment, the micromirror 20 is coupled to the intermediate coupling member 16 approximately at the center thereof. Accordingly, it is possible to prevent the reflective plane 21 from decreasing its planarity due to unnecessary stress moment caused by the displacements of the yokes 13, 14 and 15. Specifically, if the yokes 13, 14 and 15 have displaced individually around the axis A of rotation, then unnecessary stress moment will be produced due to the difference between the respective relative angles of the yokes 13, 14 and 15. However, only the intermediate coupling member 16 will be flexed due to the moment and the planarity of the micromirror 20, which is coupled to the intermediate coupling member 16 at the single point 16a, will never be affected.

In the configuration of this preferred embodiment, by selectively applying drive voltages to the fixed-electrode pieces 5a, 5b, 6a, 6b, 7a and 7b of the first, second and third fixed electrodes 5, 6 and 7, the micromirror 20 can be driven bidirectionally (i.e., positive and negative directions), no matter whether the micromirror 20 needs to be displaced in the z direction or tilted around the x axis and/or y axis.

In displacing the micromirror 20 perpendicularly away from the substrate 1, the fixed-electrode pieces 5a, 6b and 7a may be selected and supplied with the drive voltages such that the protrusion members 17, 18 and 19 displace to the same degree in the positive direction along the z axis. Conversely, in displacing the micromirror 20 toward the substrate 1, the fixed-electrode pieces 5b, 6a and 7b may be selected and supplied with drive voltages such that the protrusion members 17, 18 and 19 displace to the same degree in the negative direction along the z axis.

In tilting the micromirror 20 counterclockwise CCW around the x axis, the fixed-electrode pieces 5a, 6a and 7a may be selected and may be supplied with drive voltages such that the protrusion members 17 and 19 displace in the positive direction along the z axis and the protrusion member 18 displaces in the negative direction along the z axis to the same degree.

The operation of tilting the micromirror 20 clockwise CW around the x axis, the operation of tilting it around the y axis or any combination of these operations may also be done in a quite similar manner. In any case, just by applying required drive voltages to appropriately selected ones of the six fixed-electrode pieces 5a, 5b, 6a, 6b, 7a and 7b, the micromirror 20 can be made to take any arbitrary position with respect to the substrate 1.

It should be noted that the data about how the micromirror 20 changes its position with a combination of drive voltages being applied to the six fixed-electrode pieces 5a, 5b, 6a, 6b, 7a and 7b may be stored in advance on a table.

Next, it will be described with reference to FIG. 2 how to define the positions of a pair of adjacent reflective mirrors in a deformable mirror in which a number of micromirrors shown in FIG. 1 are arranged as an array. The deformable mirror of this preferred embodiment may be used as a member of an optical compensator for correcting a distorted wavefront into a flat one.

Figure 2:
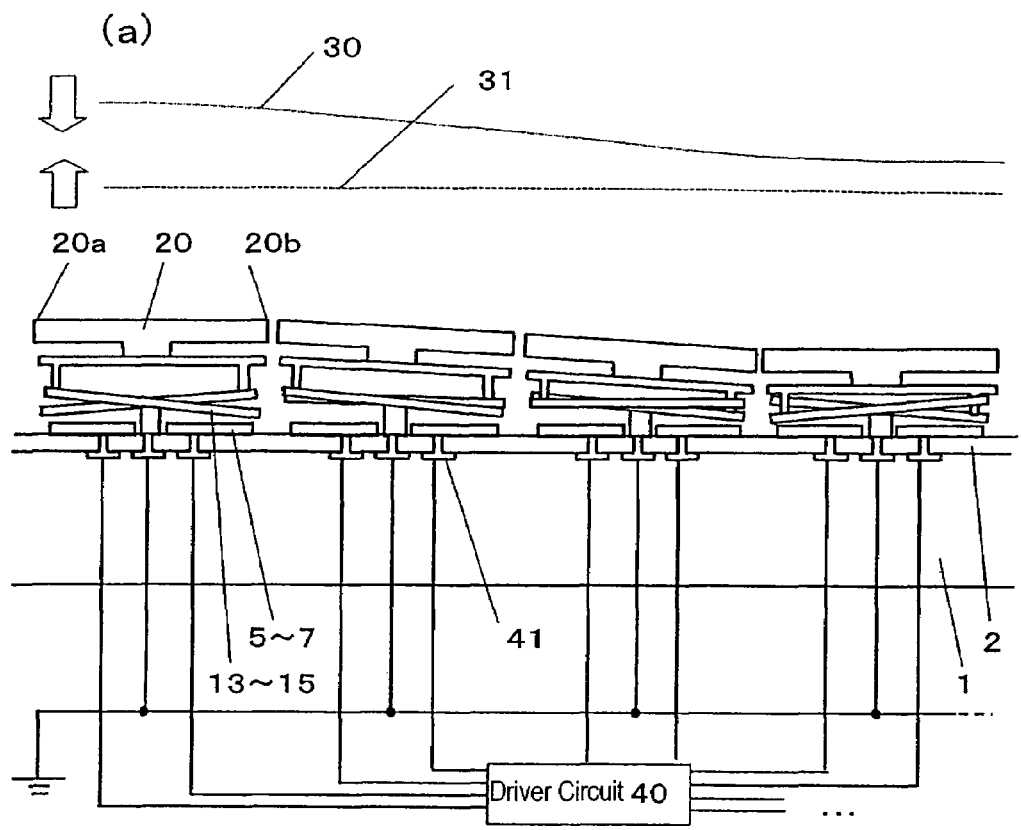
FIG. 2 is a schematic cross-sectional view of the deformable mirror of the first embodiment of the present invention.
Figure 2:
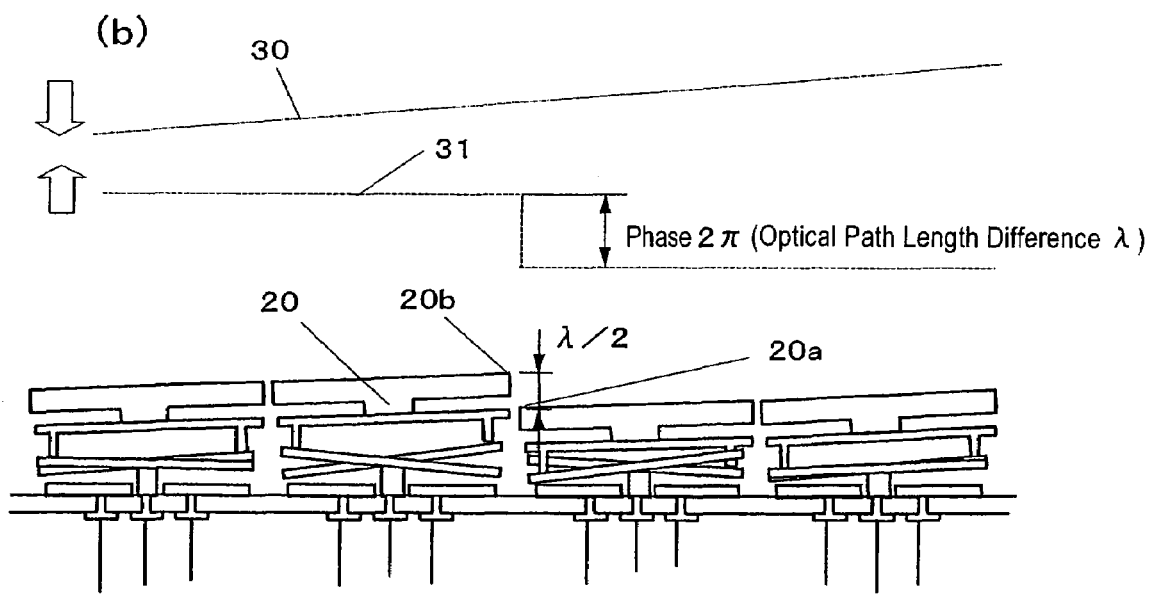

FIG. 2 schematically illustrates cross sections of a deformable mirror according to this preferred embodiment. FIG. 2(a) illustrates a situation where the wavefront is corrected by connecting a number of micromirrors 20 in series together. On the other hand, FIG. 2(b) illustrates a situation where a difference is created on a wavelength basis in optical path length at a boundary between the micromirrors 20 by utilizing the periodicity of the phase of light. The operation of a one-dimensional mirror array will be described herein for the sake of simplicity. However, a similar statement is applicable to a two-dimensional mirror array.

Suppose an incoming light ray 30 with a wavelength λ is incident perpendicularly onto the substrate 1. The incoming light ray 30 shown in FIG. 2 has a distorted wavefront as indicated by the one-dot chain. The incoming light ray 30 is then reflected by the micromirrors 20 so as to be an outgoing light ray 31. In this preferred embodiment, the wavefront of the outgoing light ray 31 has been corrected into a flat one as indicated by the dashed line in FIG. 2.

Each of the micromirrors 20 is set such that the moving stroke at the outer edge 20a, 20b thereof falls within the range of ±0.25 λ to ±0.5 λ. More specifically, while the light ray is coming to, reflected by, and leaving, the micromirror 20, settings are done such that the optical path length control range is greater than ±0.5 λ but smaller than ±1λ. By adopting these settings, the gaps between the yokes 13, 14 and 15 and the fixed electrodes 5, 6 and 7 can be minimized and as a result, a great electrostatic force can be produced even when the deformable mirror is driven with a low voltage. In addition, even if the tilt angles of the micromirrors 20 are determined preferentially, the moving stroke can be set such that the outer edge 20a, 20b on one side will have an optical path length difference of ±0.5 λ or more.

FIG. 2(a) illustrates a situation where the correction range for the wavefront of the incoming light ray 30 is within the moving stroke range of the micromirrors 20 and where the wavefront is corrected by connecting the micromirrors 20 in series together.

When the driver circuit 40 applies drive voltages to the fixed electrodes 5, 6 and 7, the yokes 13, 14 and 15 are attracted thereto with a electrostatic force, thereby controlling the position of the micromirror 20. The driver circuit 40 may generate a drive voltage value of 8 bits, for example, and is connected to the respective fixed electrodes 5, 6 and 7 on the insulating layer 2 individually by way of the via metals 41. The drive voltage for the driver circuit 40 is generated by a control circuit (not shown) based on the wavefront of the outgoing light ray 31 that has been detected by a wavefront sensor (not shown, either).

The position and location of each micromirror 20 are controlled so as to define a continuous reflective plane with a reflective mirror, which is adjacent thereto at its outer edge 20a or 20b, thereby correcting the distorted wavefront of the incoming light ray 30 into a continuous wavefront like a polygonal line. Accordingly, compared with correcting the distorted wavefront into a stepped one by simply shifting the micromirrors 20 parallel, the wavefront fit error can be minimized with a smaller number of mirrors segmented.

FIG. 2(b) illustrates a situation where the wavefront correction range of the incoming light ray 30 has exceeded the moving stroke range of the micromirrors 20. In this case, a level difference of 0.5 λ is created between the outer edge 20b of a micromirror 20 and the outer edge 20a of its adjacent reflective mirror. Then, the wavefront of the reflected light 31 causes a phase shift of 2 π (when the optical path length is λ) as indicated by the dashed line. However, in the light with a single wavelength, such a phase shift is equivalent to no phase shift at all. Stating more generally, if the arrangements of each pair of adjacent micromirrors 20 are controlled such that the optical path length difference between the incoming and reflected light rays at the boundary of the micromirrors 20 is substantially equal to n·λ (where n is an integer), an arbitrary correction range is achieved.

As described above, according to this preferred embodiment, drive voltages are applied independently to multiple fixed electrodes 5, 6 and 7, thereby displacing a micromirror 20, which is associated with these fixed electrodes 5, 6 and 7, perpendicularly to the substrate 1 and tilting the micromirror 20 toward a desired direction with respect to the substrate 1. Thus, even in a deformable mirror that adopts an electrostatic driving method with high compatibility with a semiconductor device manufacturing process, the wavefront fit error can be minimized with a smaller number of mirrors segmented.

In addition, each of the fixed electrodes 5, 6 and 7 includes a plurality of fixed-electrode pieces 5a & 5b, 6a & 6b and 7a & 7b. Accordingly, by selectively applying drive voltages to those pieces, the respective portions of their associated micromirror 20 can be brought either toward or away from the substrate 1. That is to say, the micromirror 20 can be controlled bidirectionally. Consequently, the operation of shifting the micromirror 20 parallel and the operation of tilting the micromirror 20 can be controlled independently without interfering with each other.

In the example described above, three drive sources are defined by the fixed electrodes 5, 6 and 7 and their associated yokes 13, 14 and 15. However, the number of the drive sources in a single driving section does not have to be three. Alternatively, each micromirror 20 may be shifted parallel and tilted along a single axis by using two drive sources. Optionally, each micromirror 20 may also be moved even with four or more drive sources. In particular, if the micromirror 20 is driven with four or more drive sources with the protrusion members 17, 18 and 19 directly coupled to the micromirror 20 without interposing any intermediate coupling member 16 between them and with the micromirror 20 given some flexibility, the curvature of the reflective plane 21 can also be controlled. In that case, a deformable mirror, having the features of both the continuous mirror and the segmented mirror, can be provided.

EMBODIMENT 2

Figure 3:
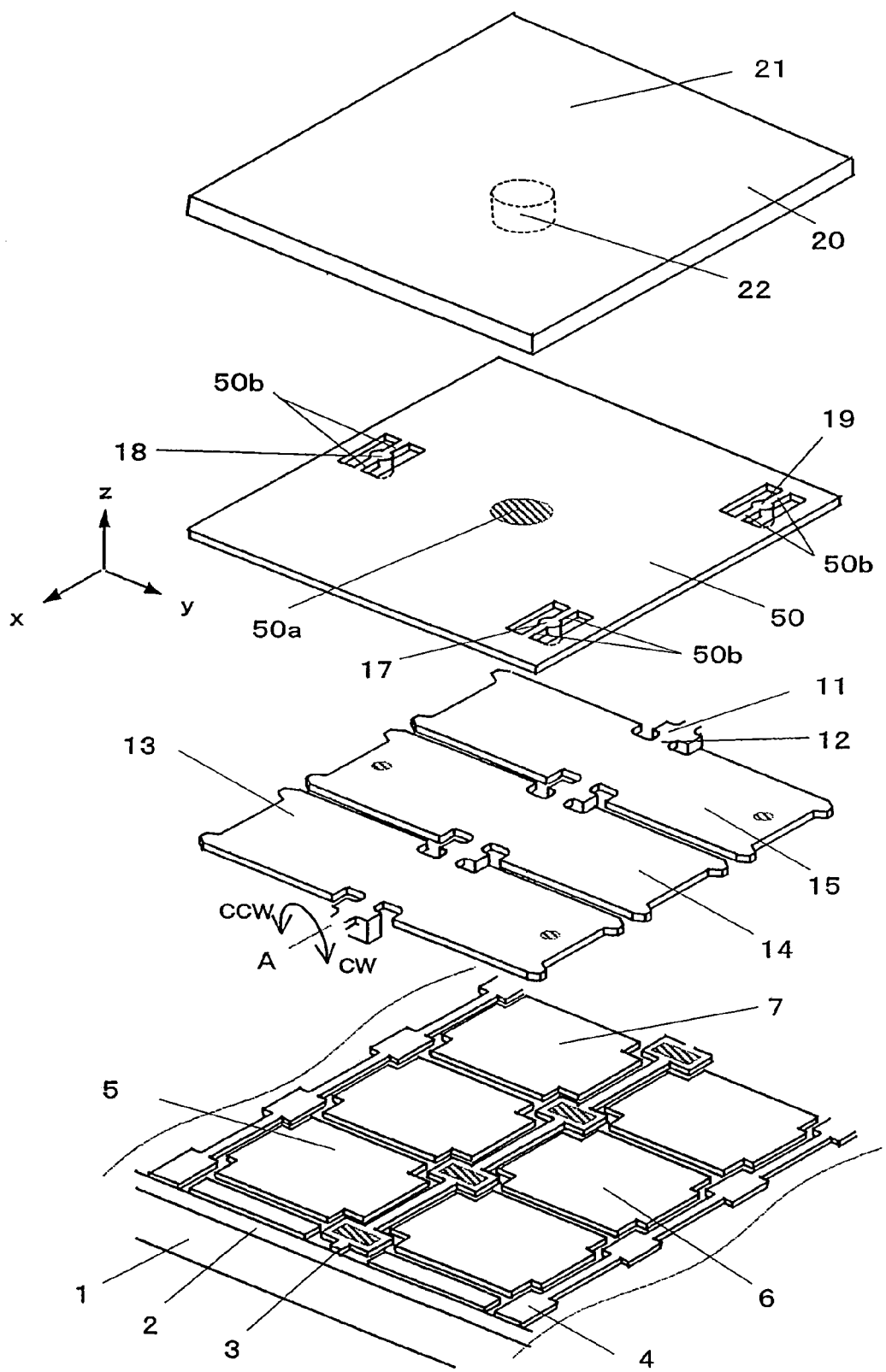
FIG. 3 is an exploded perspective view of a deformable mirror according to a second embodiment of the present invention.

Hereinafter, a deformable mirror according to a second preferred embodiment of the present invention will be described with reference to FIG. 3. FIG. 3 is an exploded perspective view of a deformable mirror according to this preferred embodiment.

The difference between the deformable mirror of this preferred embodiment and the counterpart of the first preferred embodiment lies in the configuration of the intermediate coupling member 50. That is to say, the deformable mirrors of this and first preferred embodiments have the same configuration as for the substrate 1, insulating layer 2, base 3, yoke contact portion 4, fixed electrodes 5 to 7, supporting post 11, hinge 12, yokes 13 to 15, protrusion members 17 to 19, micromirror 20, reflective plane 21 and protrusion 22.

The intermediate coupling member 50 of this preferred embodiment includes three pairs of hinge portions 50b. Each hinge portion 50b supports its associated protrusion member 17, 18 or 19 in a freely rotatable state along an axis that is defined parallel to the axis A of rotation. By using this configuration, it is possible to effectively prevent a torsion stress, which is produced when the yokes 13, 14 and 15 are displaced individually around the axis A of rotation, from flexing the overall intermediate coupling member 50. As a result, the magnitude of displacement of the hatched portion 50a, where the protrusion 22 of the micromirror 20 is coupled to the intermediate coupling member 50, and the reproducibility and linearity of the tilt angle can be increased. Consequently, the position of the micromirror 20 can be controlled with higher precision.

In the preferred embodiment described above, the hinge portions for supporting the protrusion members 17 to 19 in a rotatable state are provided for the intermediate coupling member 50. Alternatively, the hinge portions may also be provided for the yokes 13 to 15.

EMBODIMENT 3

Figure 4:
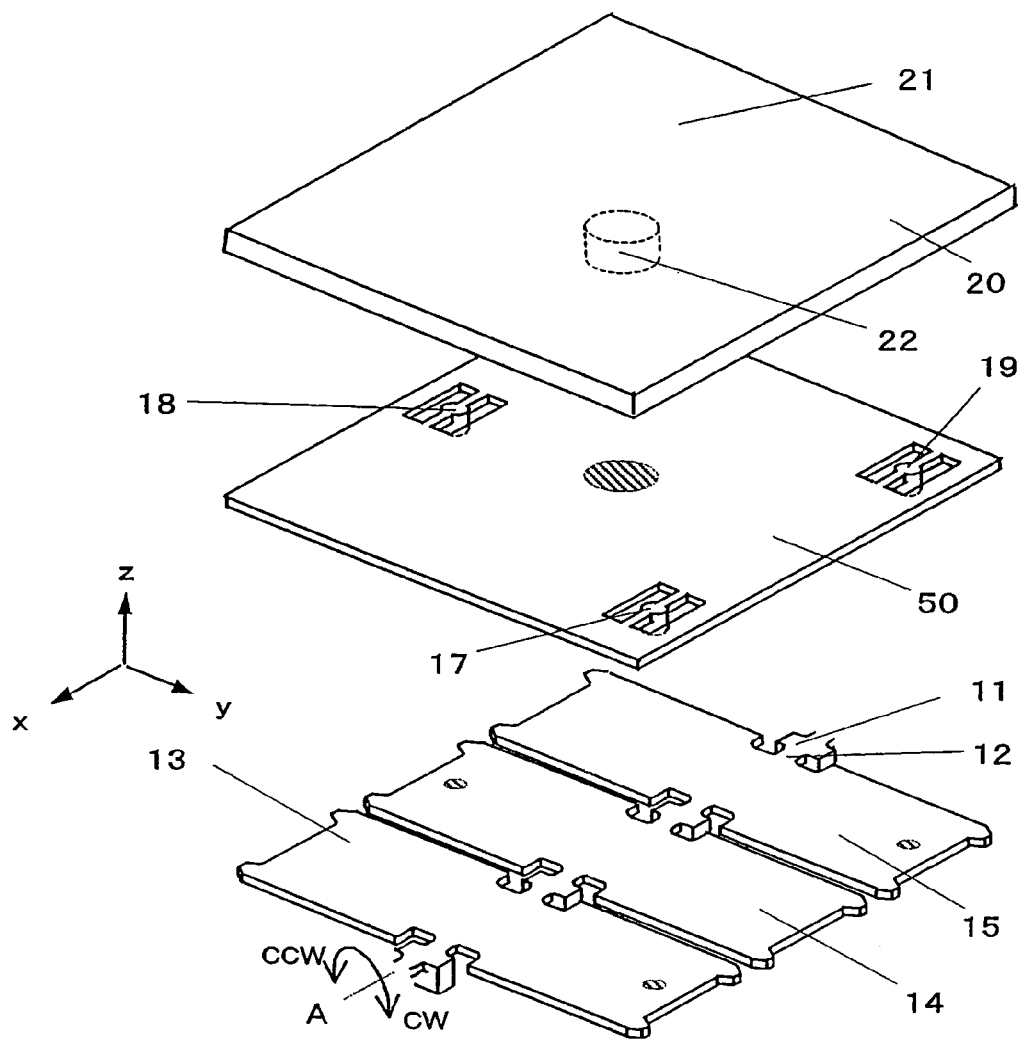
FIG. 4 is an exploded perspective view of a deformable mirror according to a third embodiment of the present invention.
Figure 4:
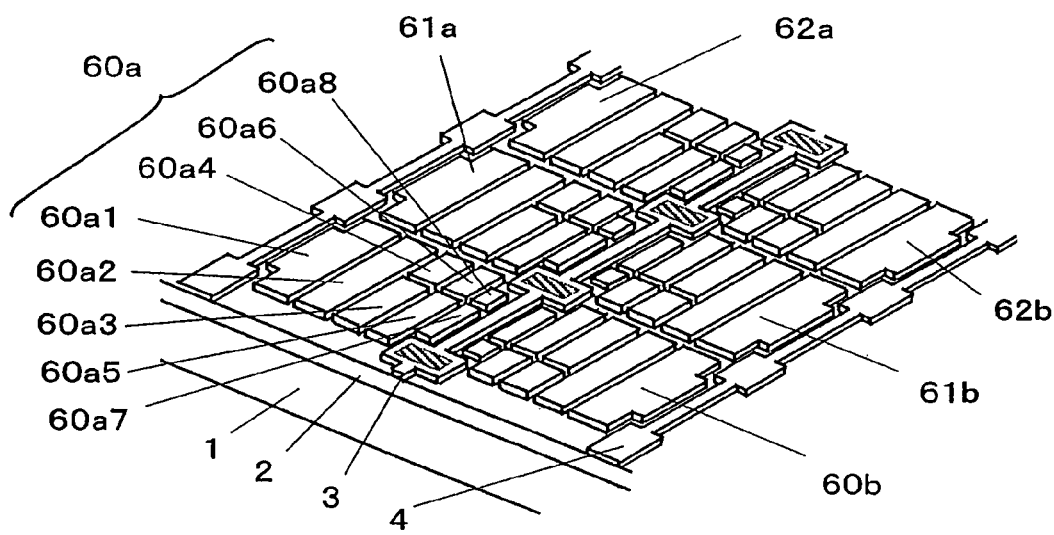

Hereinafter, a deformable mirror according to a third preferred embodiment of the present invention will be described with reference to FIG. 4. FIG. 4 is an exploded perspective view of a deformable mirror according to this preferred embodiment.

The deformable mirror of this preferred embodiment is different from the counterpart of the second preferred embodiment in the configuration of fixed electrodes 60, 61 and 62. More specifically, the first fixed electrode 60 of this preferred embodiment is divided into fixed-electrode pieces 60a and 60b, and each of the fixed-electrode pieces 60a and 60b is further subdivided into eight partial electrodes, to which drive voltages are applicable independently of each other. The following description will be focused on the fixed-electrode piece 60a, but the same statement is applicable to the other fixed-electrode piece 60b of the first fixed electrode 60 and to the fixed-electrode pieces 61a, 61b, 62a and 62b of the second and third fixed electrodes 61 and 62.

As shown in FIG. 4, the fixed-electrode piece 60a is subdivided into eight partial electrodes 60a1 through 60a8, to which drive voltages are applicable independently of each other. By adopting such a configuration, the micromirror can be driven with a digital drive voltage. Thus, there is no need to control the drive voltages in eight bits or to provide any digital-to-analog (D/A) converter anymore.

The "electrostatic force" for driving is proportional to the area of electrodes. Accordingly, the above-mentioned document "Surface Micromachined Segmented Mirrors for Adaptive Optics" discloses that the area of a partial electrode associated with a high-order bit be made twice as large as that of another partial electrode associated with a low-order bit. In an arrangement of electrodes representing eight bits, for example, the area of a partial electrode representing the most significant bit is 128 times as large as that of a partial electrode representing the least significant bit, and therefore, the difference in area between the partial electrodes is huge. Accordingly, to cope with a multi-bit application, partial electrodes representing low-order bits should have extremely small areas and the ratio of the ineffective area (of gaps) to the overall electrode area increases. In addition, a fine-line patterning process is required to make those electrodes, thus complicating the manufacturing process. Furthermore, since the electrode shapes are getting close to points, the actual operation will deviate from an operational model that is based on the electrostatic force produced between parallel plates. As a result, in response to the displacement of movable electrodes, the electrostatic force will change differently in high-order bits from in low-order bits.

To overcome such a problem, the deformable mirror of this preferred embodiment is designed such that the torque applied to a high-order-bit partial electrode so as to rotate the first yoke 13 counterclockwise CCW is twice as large as that applied to a low-order-bit partial electrode. That is to say, not just the areas of the respective partial electrodes but also the distances from the axis A of rotation to the partial electrodes are varied as design parameters. Specifically, a partial electrode representing a high-order bit is arranged more distant from the axis A of rotation than a partial electrode representing a low-order bit, thereby preventing the ratio of the area of the high-order-bit partial electrode to that of the low-order-bit partial electrode from increasing excessively.

In FIG. 4, the partial electrode 60a8 closest to the axis A of rotation represents the least significant bit (LSB), the partial electrode 60a1 most distant from the axis A of rotation represents the most significant bit (MSB), and the other partial electrodes 60a7 through 60a2 are sequentially associated with the intermediate bits. Supposing the product of the distance from the center of the LSB partial electrode 60a8 to the axis A of rotation and the area of that partial electrode 60a8 is one, the products for the other partial electrodes are powers of two (i.e., 2, 4, 8, . . . , and 128).

The respective partial electrodes may have the following areas. For example, the distance from the partial electrode 60a1 to the axis A of rotation is defined approximately eight times as long as the distance from the partial electrode 60a8 to the axis A of rotation. Accordingly, the ratio of the area of the partial electrode 60a1 to that of the partial electrode 60a8 is approximately equal to sixteen. In this manner, even in a configuration in which an eight-bit control is carried out, the ratio of the areas of the partial electrodes can be minimized, thus solving the problems described above.

In this manner, by arranging a partial electrode with a small area closer to the axis A of rotation of the yoke 13 than a partial electrode with a large area, the magnitude of displacement of the protrusion member 17 can have a sufficiently wide dynamic range and a multi-bit control can be performed just as intended without causing a huge difference in area between the partial electrodes.

EMBODIMENT 4

In the first through third preferred embodiments described above, three movable electrodes are allocated to each micromirror and are operated in an arbitrary combination, thereby controlling the arrangement of each micromirror with respect to the substrate (i.e., the distance of the mirror from the substrate and the direction the mirror faces). On the other hand, in this preferred embodiment, two movable electrodes are allocated to each micromirror and are operated in an arbitrary combination, thereby controlling the arrangement of each micromirror with respect to the substrate.

Figure 5:
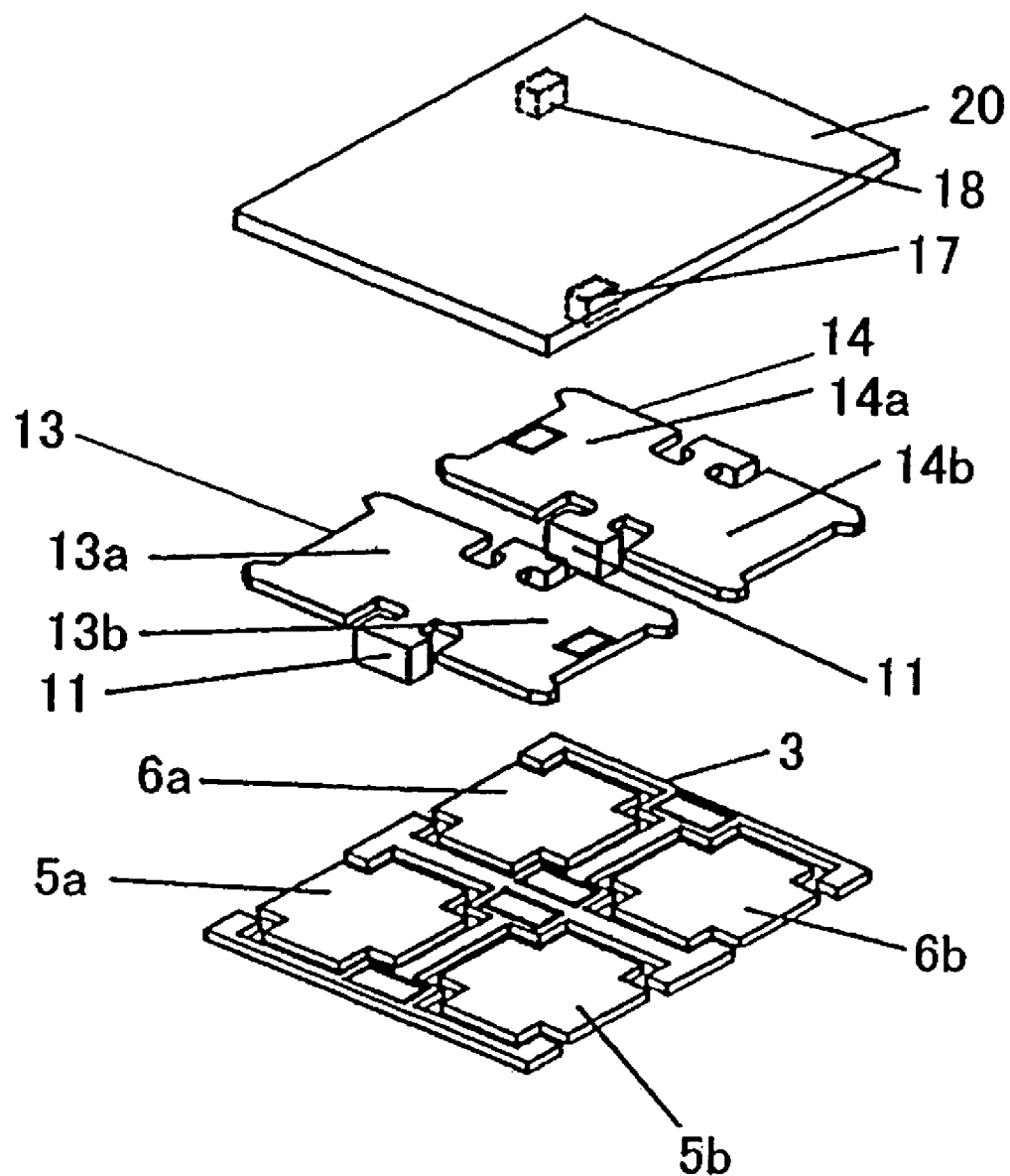
FIG. 5 is an exploded perspective view of a deformable mirror according to a fourth embodiment of the present invention.

Hereinafter, a deformable mirror according to this fourth preferred embodiment will be described with reference to FIG. 5. FIG. 5 is an exploded perspective view illustrating a micromirror 20 and a driving section to drive the micromirror in the deformable mirror of this preferred embodiment.

In this preferred embodiment, the micromirror 20 is coupled to the second portion 13b of the yoke 13 by way of the protrusion member 17 and to the first portion 14a of the yoke 14 by way of the protrusion member 18, respectively.

In this preferred embodiment, the micromirror 20 is directly coupled to the two yokes 13 and 14 without using any intermediate coupling member 16 unlike the preferred embodiments described above. Since there is no intermediate coupling member 16, the number of manufacturing process steps can be reduced advantageously. However, as this deformable mirror is driven, a stress is produced on the micromirror 20. For that reason, the micromirror 20 is preferably given some flexibility.

The configuration of this preferred embodiment is simpler than that of any other preferred embodiment described above. However, each micromirror 20 can also be shifted parallel and tilted along one axis according to this preferred embodiment.

EMBODIMENT 5

An optical controller according to a preferred embodiment of the present invention will be described with reference to FIG. 6. This optical controller is a focal point controller using a deformable mirror. In this preferred embodiment, the optical controller is used as an optical cross-connector for selectively connecting a plurality of inputting and outputting optical fiber arrays.

Figure 6:
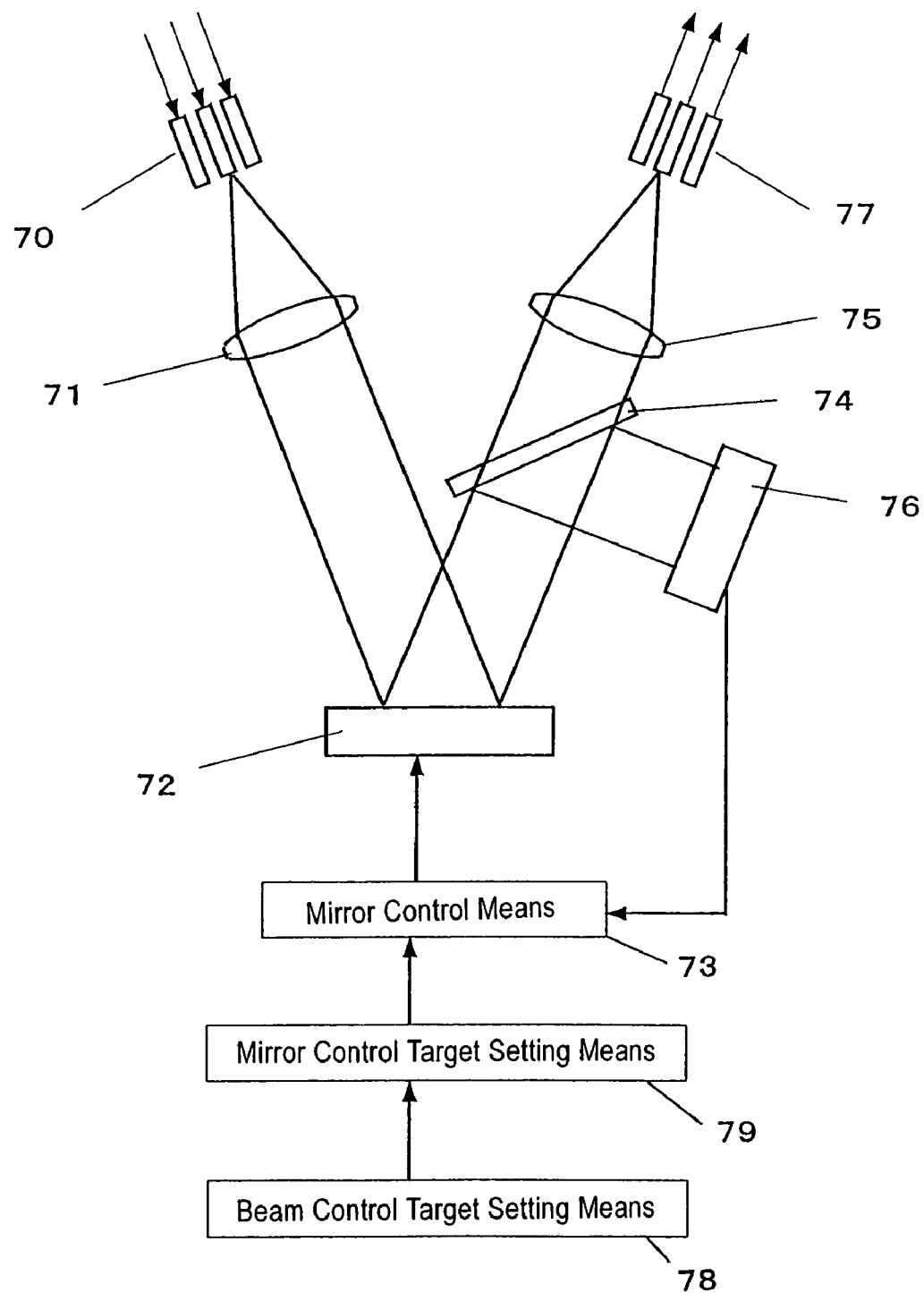
FIG. 6 is a schematic representation illustrating an optical controller according to an embodiment (fifth embodiment) of the present invention.

As shown in FIG. 6, the inputting optical fiber array 70 is a bundle of N×N signal inputting optical fibers. In this case, the respective ends of the signal inputting optical fibers make up a two-dimensional array of N×N optical fibers. In this preferred embodiment, the optical fibers are arranged with N set equal to eight and with the pitch of two adjacent optical fibers set equal to 250 μm. Light that has gone out of a single optical fiber is transformed by a lens 71 into a substantially parallel beam. The lens 71 has a focal length f of 40 mm and an aperture of 8 mm, and the inputting optical fiber array 70 is arranged near the focal point of the lens 71.

The deformable mirror 72 may be a deformable mirror according to any of the first through fourth preferred embodiments described above and includes a driver circuit. On receiving a control signal from mirror control means 73, the driver circuit controls the position of each reflective mirror.

Part of the light reflected from the deformable mirror 72 is transmitted through a half mirror 74 to a lens 75 and part of the remaining light is reflected from the half mirror 74 toward a wavefront sensor 76 for detecting the wavefront state.

The light that has passed through the lens 75 is focused on the outputting optical fiber array 77. The focal length and aperture of the lens 75 are the same as those of the lens 71.

The wavefront sensor 76 is a Shack-Hartmann wavefront sensor. Just like the inputting optical fiber array 70, the outputting optical fiber array 77 is a bundle of N×N signal outputting optical fibers and the respective ends of the signal outputting optical fibers 77 make up a two-dimensional array of N×N optical fibers.

Beam control target setting means 78 determines from which optical fiber a light beam should be emitted and then toward which optical fiber the light beam should be deflected between the inputting and outputting optical fiber arrays 70 and 77, and then outputs that correspondence information to mirror control target setting means 79. The mirror control target setting means 79 sets the target positions of the respective mirrors to achieve that correspondence between the input and output beams. In this preferred embodiment, the target mirror positions are set with a predefined table of correspondence. Accordingly, when the output of the beam control target setting means 78 is fed thereto as an address, the distances of the respective mirrors from the substrate and two-axis tilt angles are output. This table of correspondence is predefined through calculations or experiments and written on a ROM.

The mirror control means 73 outputs driving control signals for the respective mirrors while using the output of the mirror control target setting means 79 as a target value and the output of the wavefront sensor 76 as feedback information.

In this configuration, the deformable mirror 72 functions as a phase-modulating spatial light modulator for controlling the light beams such that the light beam emitted from a selected inputting optical fiber is focused on the fixed location of any desired outputting optical fiber. Unlike a normal binary spatial light modulator, the deformable mirror 72 of this preferred embodiment achieves a shape of blades by controlling the tilt angles of the respective reflective mirrors, thus increasing the diffraction efficiency significantly. As a result, the light can be transmitted much more efficiently between the inputting and outputting fibers and the crosstalk can also be minimized by preventing unwanted diffracted light from entering other outputting optical fibers.

It should be noted that the beam control target setting means 78 can not only define the one-to-one correspondence between an inputting optical fiber and its associated outputting optical fiber but also convert an input optical signal into a one-to-multiple fan-out configuration. In the latter case, the mirror control target setting means 79 sets the wavefront of the mirrors so as to produce multiple beams.

In the preferred embodiment described above, the mirror control means 73 performs a control operation using a feedback signal supplied from the wavefront sensor 76. However, the present invention is in no way limited to this specific preferred embodiment. Alternatively, an open control may also be carried out without using this feedback signal if the deformable mirror 72 has sufficient obedience.

Also, in the preferred embodiment described above, the optical controller is used as an optical cross-connector. However, the present invention is in no way limited to this specific preferred embodiment. Alternatively, the present invention is also applicable for use in a projection type display for scanning R, G and B light rays on desired locations on the screen. Furthermore, the present invention is applicable to an optical deflector using a deformable mirror with a shape of blades and to a beam-condensing unit with a variable focal point.

INDUSTRIAL APPLICABILITY

A deformable mirror according to the present invention can control a micromirror independently by displacing the micromirror perpendicularly to a substrate and tilting the micromirror with respect to the substrate with an electrostatic force to be produced by a potential difference between a plurality of fixed electrodes, to which drive voltages are applicable independently, and movable electrodes facing them. Accordingly, an electrostatic driving type deformable mirror, which can be fabricated easily by a semiconductor device manufacturing process, can minimize the wavefront fit error even though the number of mirrors segmented is small.

Also, if each of the fixed electrodes includes a plurality of fixed-electrode pieces, drive voltages may be selectively applied to those fixed-electrode pieces so that the respective portions of its associated micromirror can be controlled bidirectionally, i.e., brought toward the substrate and away from the substrate. As a result, the operation of shifting the micromirror parallel and the operation of tilting the micromirror can be independently controlled without interfering with each other.

Furthermore, if the rotational member (or movable electrode), which rotates on the axis of rotation, acts on the micromirror by way of a functional member and if the flat-plate portion of this rotational member faces first and second fixed-electrode pieces, which are arranged symmetrically to each other with respect to the axis of rotation, then a pair of electrodes, of which the area is broad enough to achieve large electrostatic force, and a supporting structure, enabling the parallel shifting and tilting operations, can be both provided within the limited area of a segmented mirror.

It should be noted that by coupling the movable electrodes to a flat-plate intermediate coupling member by way of a plurality of protrusion members and connecting the micromirror to the intermediate coupling member approximately at the center thereof, it is possible to prevent the planarity of the reflective plane from decreasing due to unnecessary stress caused by the displacement of the movable electrodes. Also, by making the intermediate coupling member support the protrusion members in a rotatable state, the position of the micromirror can be controlled with higher precision without deforming the overall intermediate coupling member.

Furthermore, if each fixed-electrode piece is made up of a plurality of partial electrodes and if a second partial electrode with a small area is arranged closer to the axis of rotation than a first partial electrode with a large area, then the magnitude of displacement of the micromirror can have a sufficiently wide dynamic range and a multi-bit control can be performed without causing a huge difference in area between the partial electrodes.

Furthermore, by using the deformable mirror of the present invention in an optical controller, optical phase modulation can be carried out with high diffraction efficiency.

The invention claimed is:

1. A deformable mirror comprising:
    a substrate;
    a plurality of micromirrors, which are supported by the substrate while being segmented from each other; and
    a plurality of driving sections, which drive the micromirrors independently of each other, thereby controlling arrangements of the respective micromirrors with respect to the substrate,
    wherein each of the driving sections includes: a number of fixed electrodes, to which drive voltages are applicable independently of each other; and the same number of movable electrodes, which are provided so as to face the fixed electrodes, and
    wherein each of the micromirrors is coupled to at least two of the movable electrodes, which are associated with the micromirror, and
    wherein the deformable mirror can:
        (i) displace each said micromirror perpendicularly to the substrate and
        (ii) tilt the micromirror with respect to the substrate by utilizing an electrostatic force to be produced due to a potential difference between the at least two movable electrodes and at least two of the fixed electrodes that are associated with the movable electrodes, wherein one or both of the perpendicular displacing and tilting can be performed.

2. The deformable mirror of claim 1, wherein each of the driving sections includes:
a first fixed electrode, which contributes to displacing a first particular portion of the micromirror; and
a second fixed electrode, which contributes to displacing a second particular portion of the same micromirror, the second particular portion being different from the first particular portion, and
wherein by applying drive voltages to the first and second fixed electrodes, the deformable mirror displaces the first and second particular portions independently of each other, thereby controlling the arrangement of the micromirror with respect to the substrate.

3. The deformable mirror of claim 2, wherein each of the first and second fixed electrodes is divided into multiple fixed-electrode pieces to which drive voltages are independently applicable, and
wherein by selectively applying the drive voltages to the multiple fixed-electrode pieces, the deformable mirror controls the displacements of the respective particular portions of the associated micromirror bidirectionally both toward the substrate and away from the substrate alike.

4. The deformable mirror of claim 3, wherein the movable electrodes include:
a rotational member, which is supported by the substrate so as to rotate on an axis of rotation; and
a functional member, which changes distances between the particular portions of the micromirror and the substrate as the rotational member moves,
wherein the rotational member includes:
a supporting portion, which is provided on the axis of rotation; and
a flat plate portion, which is connected to the supporting portion,
the flat plate portion of the rotational member including a first conductive portion and a second conductive portion, which are arranged symmetrically with respect to the axis of rotation, and
wherein the multiple fixed-electrode pieces include:
a first fixed-electrode piece, which faces the first conductive portion of the flat plate portion with a gap provide between them; and
a second fixed-electrode piece, which faces the second conductive portion of the flat plate portion with a gap provide between them.

5. The deformable mirror of claim 4, wherein the functional member includes: a flat-plate intermediate coupling member; and a plurality of protrusion members, which connect either the first conductive portion or the second conductive portion of the movable electrodes to the intermediate coupling member, and
wherein the intermediate coupling member and the micromirror are coupled together approximately at the center of the intermediate coupling member.

6. The deformable mirror of claim 5, wherein either the first conductive portion or the second conductive portion and the intermediate coupling member are rotatable freely by way of the protrusion members.

7. The deformable mirror of claim 2, wherein each of the driving sections further includes a third fixed electrode, which contributes to displacing a third particular portion of the same micromirror, the third particular portion being different from the first and second particular portions thereof, and
wherein by applying drive voltages to the first, second and third fixed electrodes, the deformable mirror displaces the first and third particular portions independently of each other, thereby controlling at least the operations of displacing the micromirror perpendicularly to the substrate and tilting the micromirror along two axes with respect to the substrate.

8. The deformable mirror of claim 4, wherein each said fixed-electrode piece includes a plurality of partial electrodes, to which drive voltages are applicable independently of each other, and
wherein the partial electrodes include at least a first partial electrode and a second partial electrode, which have mutually different areas, the area of the second partial electrode being defined smaller than that of the first partial electrode, the second partial electrode being arranged closer to the axis of rotation than the first partial electrode is.

9. The deformable mirror of claim 8, wherein the product of a distance from the center of the first partial electrode to the axis of rotation and the area of the first partial electrode is substantially a power of two times as large as the product of a distance from the center of the second partial electrode to the axis of rotation and the area of the second partial electrode.

10. The deformable mirror of claim 1, wherein each of the micromirrors reflects light with a wavelength $\lambda$, and
wherein the driving sections control the arrangements of the micromirrors such that a difference between the optical path length of light reflected by one of the micromirrors and that of light reflected by another one of the micromirrors, which is adjacent to the former micromirror, becomes substantially equal to $n \cdot \lambda$ (where n is an integer).

11. The deformable mirror of claim 1, further comprising a driver circuit for generating the drive voltages on the substrate.

12. The deformable mirror of claim 1, wherein at least the fixed electrodes and the movable electrodes are made of a patterned conductive film.

13. An optical controller comprising a deformable mirror, in which a plurality of micromirrors are supported on a substrate, so as to make the deformable mirror transform the wavefront of a light beam, which has been emitted from a light source, into a desired target wavefront, the optical controller further comprising:
beam control target setting means for setting the target wavefront;
mirror control target setting means for setting target values representing arrangements of the respective micromirrors with respect to the substrate based on the output of the beam control target setting means; and
mirror control means for controlling the respective micromirrors in accordance with the output of the mirror control target setting means,
wherein the deformable mirror is as recited in claim 1.

14. A deformable mirror comprising:
a substrate; and
a plurality of segmented micromirrors, wherein each micromirror is coupled to the substrate for rotational movement about an axis of rotation and for translational movement relative to the substrate, each micromirror being movable independently from the other micromirrors, each of the plurality of micromirrors having at least first and second drive assemblies operatively coupled to the micromirror to control movement of the micromirror, and each drive assembly including at least two fixed electrodes arranged on a first side of the micromirror, and a corresponding number of movable electrodes, operatively positioned to face the fixed electrodes, wherein:
(i) each drive assembly is operable to move in a see-saw manner about the axis of rotation,
(ii) movement of each drive assembly is independently controllable, and
(iii) rotation of each of the drive assemblies in a first direction about the axis of rotation causes the micromirror to tilt in the first direction, rotation of each of the drive assemblies in a second direction about the axis of rotation causes the micromirror to tilt in the second direction, and rotation of at least two of the drive assemblies in opposing directions about the axis of rotation causes the micromirror to be displaced either toward or away from the substrate.

15. The deformable mirror of claim 14, wherein each drive assembly further includes a yoke upon which the movable electrodes are mounted, each yoke being supported by the substrate and having a first end positioned on the first side of the axis of rotation and a second end positioned on the second side of the axis of rotation.

16. The deformable mirror of claim 15, wherein the yoke of each drive assembly is coupled to a yoke of another drive assembly by a flexible hinge positioned at least near the axis of rotation.

17. The deformable mirror of claim 15, further comprising an intermediate coupling member connected to the yoke of each drive assembly, wherein the intermediate coupling member is connected to the first end of the first drive assembly yoke and is connected to the second end of the second drive assembly yoke.

18. The deformable mirror of claim 17, wherein rotation of the first drive assembly yoke in the first direction and rotation of the second drive assembly yoke in the second direction causes the micromirror to move toward the substrate and rotation of the first drive assembly yoke in the second direction and rotation of the second drive assembly yoke in the first direction causes the micromirror to move away from the substrate.

19. The deformable mirror of claim 17, wherein rotation of the first drive assembly yoke in the first direction by a first amount and rotation of the second drive assembly yoke in the first direction by a second amount different from the first amount causes the micromirror to rotate about a second axis of rotation.

20. The deformable mirror of claim 17, further comprising a third drive assembly, wherein the intermediate coupling member is connected to the first end of the third drive assembly yoke.

21. The deformable mirror of claim 20, wherein rotation of the second drive assembly yoke in the first direction and rotation of the first and third drive assembly yokes in the second direction causes the micromirror to move away from the substrate and rotation of the second drive assembly yoke in the second direction and rotation of the first and third drive assembly yokes in the first direction causes the micromirror to move toward the substrate.

22. The deformable mirror of claim 20, wherein rotation of the first drive assembly yoke in the first direction by a first amount and rotation of the second drive assembly yoke in the first direction by a second amount greater than the first amount and rotation of the third drive assembly yoke in the first direction by a third amount greater than the second amount causes the micromirror to rotate about a second axis of rotation.

* * * * *

UNITED STATES PATENT AND TRADEMARK OFFICE
CERTIFICATE OF CORRECTION

PATENT NO. : 7,068,415 B2 Page 1 of 1
APPLICATION NO. : 10/491100
DATED : June 27, 2006
INVENTOR(S) : Yoshihiro Mushika It is certified that error appears in the above-identified patent and that said Letters Patent is hereby corrected as shown below:

Title Page, Section (56), Page 2 Foreign Patent Documents:

Reference "JP 02/061488" should read -- WO 02/061488 --;
Reference -- JP 10-222856 8/1998 -- should be inserted.

Signed and Sealed this

Twelfth Day of December, 2006

JON W. DUDAS
*Director of the United States Patent and Trademark Office*